United States Patent
Yang et al.

(10) Patent No.: US 10,159,085 B2
(45) Date of Patent: Dec. 18, 2018

(54) SCHEDULING METHOD, ACCESS POINT, SCHEDULING SERVER, AND SCHEDULING SYSTEM

(71) Applicant: Huawei Technologies Co., Ltd., Shenzhen (CN)

(72) Inventors: Xun Yang, Shenzhen (CN); Yi Luo, Shenzhen (CN); Jiayin Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 190 days.

(21) Appl. No.: 15/184,830

(22) Filed: Jun. 16, 2016

(65) Prior Publication Data
US 2016/0302217 A1   Oct. 13, 2016

Related U.S. Application Data

(63) Continuation of application No. PCT/CN2013/089700, filed on Dec. 17, 2013.

(51) Int. Cl.
| | |
|---|---|
| *H04W 72/12* | (2009.01) |
| *H04W 88/08* | (2009.01) |
| *H04W 72/04* | (2009.01) |
| *H04W 16/14* | (2009.01) |
| *H04W 88/02* | (2009.01) |

(52) U.S. Cl.
CPC ........... *H04W 72/12* (2013.01); *H04W 16/14* (2013.01); *H04W 72/0453* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | |
|---|---|---|
| 2008/0159334 A1 | 7/2008 | Venkatachalam et al. |
| 2009/0103483 A1 | 4/2009 | Higuchi et al. |
| 2009/0285167 A1 | 11/2009 | Hirsch et al. |

(Continued)

FOREIGN PATENT DOCUMENTS

| | | |
|---|---|---|
| CN | 101167395 A | 4/2008 |
| CN | 101479994 A | 7/2009 |

(Continued)

*Primary Examiner* — Jason E Mattis
*Assistant Examiner* — Hong Shao
(74) *Attorney, Agent, or Firm* — Slater Matsil, LLP

(57) ABSTRACT

Embodiments disclose a scheduling method. The method includes sending, by an access point, a scheduling request to a first scheduling server according to a data transmission requirement, where the scheduling request includes frequency band bandwidth information of a contention frequency band that is applied for and frequency band use time information of the contention frequency band that is applied for. The method also includes receiving, by the access point, a contention frequency band that is allocated by the first scheduling server to the access point according to a spectrum list and the scheduling request, where the spectrum list includes at least frequency band use information and interference information of the access point. The method also includes performing, by the access point, scheduling transmission by using the allocated contention frequency band.

16 Claims, 4 Drawing Sheets

(56) References Cited

U.S. PATENT DOCUMENTS

| | | | |
|---|---|---|---|
| 2012/0093009 A1 | 4/2012 | Wang et al. | |
| 2013/0201896 A1* | 8/2013 | Ono | H04B 7/024 370/312 |
| 2013/0203429 A1* | 8/2013 | Kneckt | H04W 72/1263 455/450 |
| 2015/0003377 A1 | 1/2015 | Wu et al. | |

FOREIGN PATENT DOCUMENTS

| | | | |
|---|---|---|---|
| CN | 101569115 A | 10/2009 |
| CN | 101730242 A | 6/2010 |
| CN | 102835139 A | 12/2012 |
| CN | 103155638 A | 6/2013 |
| CN | 103298135 A | 9/2013 |

* cited by examiner

SCHEDULING METHOD, ACCESS POINT, SCHEDULING SERVER, AND SCHEDULING SYSTEM

CROSS-REFERENCE TO RELATED APPLICATIONS

This application is a continuation of International Patent Application No. PCT/CN2013/089700, filed on Dec. 17, 2013, which is hereby incorporated by reference in its entirety.

TECHNICAL FIELD

The present invention relates to the field of communications technologies, and in particular, to a scheduling method, an access point, a scheduling server, and a scheduling system.

BACKGROUND

Access modes of a current wireless communications system may be mainly classified into two types: scheduling access and contention access. The scheduling access is generally applied to authorized frequency bands, that is, some charging frequency bands, for example, various cellular networks such as a Global System for Mobile Communications (GSM for short), a Universal Mobile Telecommunications System (UMTS for short), Worldwide Interoperability for Microwave Access (WiMAX for short), and Long Term Evolution (LTE for short). The contention access generally operates on non-authorized frequency bands, that is, some free frequency bands, for example, Wireless Local Area Networks (WLAN for short). Because a contention access mechanism introduces a large quantity of delays and collisions, a WLAN system not an efficient system. Especially, when a quantity of terminals that request to access the system or have accessed the system is growing, the busyness of the system also increases drastically. To resolve this problem, existing scheduling access may be introduced based on a contention access mode in the WLAN system, and a station (STA) or an access point is instructed, according to an actual situation, to switch between contention access and scheduling access. However, this solution supports only full-band use, that is, either contention access is used on all frequency bands or scheduling access is used on all frequency bands; moreover, the scheduling access mode is based on signaling design of contention access. Therefore, overheads and flexibility are inevitably limited.

SUMMARY

Embodiments provide a scheduling method, an access point, a scheduling server, and a scheduling system, so as to achieve an objective of coexistence of scheduling access and contention access, and improve efficiency and compatibility of a wireless communications system.

A first aspect of the embodiments provides a scheduling method. The method includes sending, by an access point, a scheduling request to a first scheduling server according to a data transmission requirement, where the scheduling request includes frequency band bandwidth information of a contention frequency band that is applied for and frequency band use time information of the contention frequency band that is applied for. The method also includes receiving, by the access point, a contention frequency band that is allocated by the first scheduling server to the access point according to a spectrum list and the scheduling request, where the spectrum list includes at least frequency band use information and interference information of the access point. The method also includes performing, by the access point, scheduling transmission by using the allocated contention frequency band.

In a first possible implementation manner of the first aspect, the sending, by an access point, a scheduling request to a first scheduling server according to a data transmission requirement includes: determining, by the access point according to the data transmission requirement, whether data is transmitted in a contention frequency band manner or a scheduling frequency band manner, and if data is transmitted in the scheduling frequency band manner, sending the scheduling request to the first scheduling server.

With reference to the first possible implementation manner of the first aspect, in a second possible implementation manner, the determining, by the access point according to the data transmission requirement, whether data is transmitted in a contention frequency band manner or a scheduling frequency band manner specifically includes: when a service priority of the data transmission requirement is lower than a preset priority, or when a data capacity of the data transmission requirement is less than a preset capacity, or when a data packet length of the data transmission requirement is greater than a preset packet length, or when a data rate of the data transmission requirement is less than a preset rate, transmitting data in the contention frequency band manner; or when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate, transmitting data in the scheduling frequency band manner.

With reference to the first aspect or with reference to the first or second possible implementation manner of the first aspect, in a third possible implementation manner, the performing, by the access point, scheduling transmission by using the allocated contention frequency band includes: sending, by the access point to a station (STA) associated with the access point, data directly by using the allocated contention frequency band without listening on a channel; or instructing, by the access point, a station (STA) associated with the access point to switch from a contention access mode to a scheduling access mode, so that the station (STA) associated with the access point sends data to the access point directly by using the allocated contention frequency band without listening on a channel.

With reference to the first aspect or with reference to the first, second, or third possible implementation manner of the first aspect, in a fourth possible implementation manner, the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information comprises an interference source, an interference frequency band range, and interference intensity.

With reference to the first aspect or with reference to the first, second, third, or fourth possible implementation manner of the first aspect, in a fifth possible implementation manner, if a management area of the first scheduling server and a management area of a second scheduling server have an overlapping area, and the access point is located in the overlapping area, the method includes: after sending the scheduling request to the first scheduling server, receiving, by the access point, a decision result returned by a decision server or receiving a decision result forwarded by the first scheduling server, and performing scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or after sending the scheduling request to the first scheduling server, receiving, by the access point, a contention frequency band that is allocated by the first scheduling server to the access point according to a frequency band range allocated in advance by a decision server, and performing scheduling transmission.

With reference to the fifth possible implementation manner of the first aspect, in a sixth possible implementation manner, the allocated contention frequency band in the decision result is determined by the decision server in at least one of the following manners: allocating different frequency bands to different access points; and allocating different time ranges for using a same frequency band to different access points.

With reference to the first aspect or with reference to the first, second, third, fourth, fifth, or sixth possible implementation manner of the first aspect, in a seventh possible implementation manner, the method further includes: if the access point detects, in coverage thereof, another access point that is not connected to the first scheduling server, reporting location information, coverage information, and information about an occupied contention frequency band that are of the detected another access point to the first scheduling server, so that the first scheduling server updates the spectrum list and performs contention frequency band scheduling according to an updated spectrum list.

With reference to the first aspect or with reference to the first, second, third, fourth, fifth, sixth, or seventh possible implementation manner of the first aspect, in an eighth possible implementation manner, the method further includes: broadcasting, by the access point to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

With reference to the first aspect or with reference to the first, second, third, fourth, fifth, sixth, seventh, or eighth possible implementation manner of the first aspect, in a ninth possible implementation manner, the method further includes: receiving, by the access point, scheduling termination information sent by the first scheduling server, and stopping using a contention frequency band indicated in the scheduling termination information for scheduling transmission; or when duration in which the access point performs scheduling transmission by using the contention frequency band allocated by the first scheduling server reaches duration defined in the frequency band use time information of the contention frequency band that is applied for, stopping, by the access point, using the contention frequency band allocated by the first scheduling server for scheduling transmission.

With reference to the first aspect or with reference to the first, second, third, fourth, fifth, sixth, seventh, eighth, or ninth possible implementation manner of the first aspect, in a tenth possible implementation manner, the scheduling request further includes: frequency band range information of the contention frequency band that is applied for.

A second aspect of the embodiments provides a scheduling method. The method includes receiving, by an access point, a contention frequency band that is allocated by a first scheduling server to the access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point. The method also includes performing, by the access point, scheduling transmission by using the contention frequency band allocated by the first scheduling server.

In a first possible implementation manner of the second aspect, the performing, by the access point, scheduling transmission by using the contention frequency band allocated by the first scheduling server includes: sending, by the access point to a station (STA) associated with the access point, data directly by using the allocated contention frequency band in scheduling indication information without listening on a channel; or instructing, by the access point, a station (STA) associated with the access point to switch from a contention access mode to a scheduling access mode, so that the station (STA) associated with the access point sends data to the access point directly by using the allocated contention frequency band in scheduling indication information without listening on a channel.

With reference to the second aspect or with reference to the first possible implementation manner of the second aspect, in a second possible implementation manner, the interference information is acquired by the access point by listening on the channel and is reported the interference information is obtained, through calculation, by the first scheduling server according to location information of the access point and signal receiving and transmitting statuses of another access point that is a preset distance from the access point; and the interference information comprises an interference source, an interference frequency band range, and interference intensity.

With reference to the second aspect or with reference to the first or second possible implementation manner of the second aspect, in a third possible implementation manner, if a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

With reference to the third possible implementation manner of the second aspect, in a fourth possible implementation manner, the frequency band range allocated in advance is determined by the decision server in at least one of the following manners: allocating different frequency bands to different access points; and allocating different time ranges for using a same frequency band to different access points.

In a fifth possible implementation manner of the second aspect, the method further includes: sending, by the access point, a scheduling request to the first scheduling server according to a data transmission requirement, where the scheduling request includes frequency band bandwidth information of a contention frequency band that is applied for and frequency band use time information of the contention frequency band that is applied for. The method also includes receiving, by the access point within second preset duration, a contention frequency band that is allocated by the first scheduling server to the access point according to the spectrum list and the scheduling request, where the second preset duration is less than the first preset duration. The method also includes, if the contention frequency band that is allocated by the first scheduling server to the access point according to the scheduling indication table and the spectrum list has been taken back by the first scheduling server, performing, by the access point, scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, performing, by the access point, scheduling transmission by using the contention frequency band that is allocated by the first scheduling server according to the scheduling indication table and the spectrum list and the contention frequency band that is allocated by the first scheduling server to the access point according to the spectrum list and the scheduling request.

A third aspect of the embodiments provides a scheduling method. The method includes receiving, by a first scheduling server, a scheduling request that is sent by an access point according to a data transmission requirement, where the scheduling request includes frequency band bandwidth information of a contention frequency band that is applied for and frequency band use time information of the contention frequency band that is applied for. The method also includes allocating, by the first scheduling server, a contention frequency band to the access point according to a spectrum list and the scheduling request, where the spectrum list includes at least frequency band use information and interference information of the access point. The method also includes sending a contention frequency band allocation result to the access point, so that the access point performs scheduling transmission by using the allocated contention frequency band.

In a first possible implementation manner of the third aspect, the scheduling request is initiated when the access point determines, according to the data transmission requirement, that data needs to be transmitted in a scheduling frequency band manner, which specifically includes: the scheduling request is initiated by the access point when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate.

With reference to the third aspect or with reference to the first possible implementation manner of the third aspect, in a second possible implementation manner, the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity.

With reference to the third aspect or with reference to the first or second possible implementation manner of the third aspect, in a third possible implementation manner, after the sending a contention frequency band allocation result to the access point, the method further includes: updating, by the first scheduling server, the spectrum list, and recording the allocated contention frequency band and an allocated use time thereof.

With reference to the third aspect or with reference to the first, second, or third possible implementation manner of the third aspect, in a fourth possible implementation manner, the method further includes: if a management area of the first scheduling server and a management area of a second scheduling server have an overlapping area, and the access point is located in the overlapping area, after the first scheduling server receives the scheduling request sent by the access point, sending, by the first scheduling server, the scheduling request to a decision server, receiving a decision result that is returned by the decision server after the decision server makes a decision, and forwarding the decision result to the access point, so that the access point performs scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or allocating, by the first scheduling server, a contention frequency band to the access point according to a frequency band range that is allocated in advance by a decision server.

With reference to the fourth possible implementation manner of the third aspect, in a fifth possible implementation manner, the allocated contention frequency band in the decision result is determined by the decision server in at least one of the following manners: allocating different frequency bands to different access points; and allocating different time ranges for using a same frequency band to different access points.

With reference to the third aspect or with reference to the first, second, third, fourth, or fifth possible implementation manner of the third aspect, in a sixth possible implementation manner, the method further includes: if the access point detects, in coverage thereof, another access point that is not connected to the first scheduling server, receiving, by the first scheduling server, location information, coverage information, and information about an occupied contention frequency band of the another access point that are reported by the access point; and updating, by the first scheduling server, the spectrum list, and performing contention frequency band scheduling according to an updated spectrum list.

With reference to the third aspect or with reference to the first, second, third, fourth, fifth, or sixth possible implementation manner of the third aspect, in a seventh possible implementation manner, the method further includes: sending, by the first scheduling server, scheduling termination information to the access point, to instruct the access point to stop using a contention frequency band indicated in the scheduling termination information for scheduling transmission; or when duration in which the access point performs scheduling transmission by using the contention frequency band allocated by the first scheduling server reaches duration defined in the frequency band use time information of the contention frequency band that is applied for, taking back, by the first scheduling server, the allocated contention frequency band and updating the spectrum list.

With reference to the third aspect or with reference to the first, second, third, fourth, fifth, sixth, or seventh possible implementation manner of the third aspect, in an eighth possible implementation manner, the scheduling request further includes: frequency band range information of the contention frequency band that is applied for.

A fourth aspect of the embodiments provides a scheduling method. The method includes allocating, by a first scheduling server, a contention frequency band to an access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point. The method also includes sending a contention frequency band allocation result to the access point, so that the access point performs scheduling transmission by using the allocated contention frequency band.

In a first possible implementation manner of the fourth aspect, the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity.

With reference to the fourth aspect or with reference to the first possible implementation manner of the fourth aspect, in a second possible implementation manner, if a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

With reference to the second possible implementation manner of the fourth aspect, in a third possible implementation manner, the frequency band range allocated in advance is determined by the decision server in at least one of the following manners: allocating different frequency bands to different access points; and allocating different time ranges for using a same frequency band to different access points.

With reference to the fourth aspect or with reference to the first, second, or third possible implementation manner of the fourth aspect, in a fourth possible implementation manner, the method further includes: receiving, by the first scheduling server, a scheduling request that is sent by the access point according to a data transmission requirement, where the scheduling request includes frequency band bandwidth information of a contention frequency band that is applied for and frequency band use time information of the contention frequency band that is applied for; allocating, by the first scheduling server within second preset duration, a contention frequency band to the access point according to the spectrum list and the scheduling request, where the second preset duration is less than the first preset duration; and if the contention frequency band that is allocated by the first scheduling server to the access point according to the scheduling indication table and the spectrum list has been taken back by the first scheduling server, instructing the access point to perform scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, instructing the access point to perform scheduling transmission by using the contention frequency band that is allocated by the first scheduling server according to the scheduling indication table and the spectrum list and the contention frequency band that is allocated by the first scheduling server to the access point according to the spectrum list and the scheduling request.

A fifth aspect of the embodiments provides an access point. The access point includes a sending unit, configured to send a scheduling request to a first scheduling server according to a data transmission requirement, where the scheduling request includes frequency band bandwidth information of a contention frequency band that is applied for and frequency band use time information of the contention frequency band that is applied for. The access point also includes a receiving unit, configured to receive a contention frequency band that is allocated by the first scheduling server to the access point according to a spectrum list and the scheduling request, where the spectrum list includes at least frequency band use information and interference information of the access point. The access point also includes a scheduling transmission unit, configured to perform scheduling transmission by using the allocated contention frequency band.

In a first possible implementation manner of the fifth aspect, the sending unit is further configured to determine, according to the data transmission requirement, whether data is transmitted in a contention frequency band manner or a scheduling frequency band manner, and if data is transmitted in the scheduling frequency band manner, send the scheduling request to the first scheduling server.

With reference to the first possible implementation manner of the fifth aspect, in a second possible implementation manner, the sending unit is further configured to: when a service priority of the data transmission requirement is lower than a preset priority, or when a data capacity of the data transmission requirement is less than a preset capacity, or when a data packet length of the data transmission requirement is greater than a preset packet length, or when a data rate of the data transmission requirement is less than a preset rate, transmit data in the contention frequency band manner; or when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate, transmit data in the scheduling frequency band manner.

With reference to the fifth aspect or with reference to the first or second possible implementation manner of the fifth aspect, in a third possible implementation manner, the scheduling transmission unit is specifically configured to send, to a station (STA) associated with the access point, data directly by using the allocated contention frequency band without listening on a channel; or instruct a station (STA) associated with the access point to switch from a contention access mode to a scheduling access mode, so that the station (STA) associated with the access point sends data to the access point directly by using the allocated contention frequency band without listening on a channel.

With reference to the fifth aspect or with reference to the first, second, or third possible implementation manner of the fifth aspect, in a fourth possible implementation manner, the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity.

With reference to the fifth aspect or with reference to the first, second, third, or fourth possible implementation manner of the fifth aspect, in a fifth possible implementation manner, if a management area of the first scheduling server and a management area of a second scheduling server have an overlapping area, and the access point is located in the overlapping area, after the sending unit sends the scheduling request to the first scheduling server, the receiving unit is further configured to receive a decision result returned by a decision server or receive a decision result forwarded by the first scheduling server, and the scheduling transmission unit is further configured to perform scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or after the sending unit sends the scheduling request to the first scheduling server, the receiving unit is further configured to receive a contention frequency band that is allocated by the first scheduling server to the access point according to a frequency band range allocated in advance by a decision server, and instruct the scheduling transmission unit to perform scheduling transmission.

With reference to the fifth possible implementation manner of the fifth aspect, in a sixth possible implementation manner, the allocated contention frequency band in the decision result is determined by the decision server in at least one of the following manners: allocating different frequency bands to different access points; and allocating different time ranges for using a same frequency band to different access points.

With reference to the fifth aspect or with reference to the first, second, third, fourth, fifth, or sixth possible implementation manner of the fifth aspect, in a seventh possible implementation manner, the access point further includes: a monitoring unit, configured to: if another access point that is not connected to the first scheduling server is detected in coverage of the access point, report location information, coverage information, and information about an occupied contention frequency band that are of the detected another access point to the first scheduling server, so that the first scheduling server updates the spectrum list and performs contention frequency band scheduling according to an updated spectrum list.

With reference to the fifth aspect or with reference to the first, second, third, fourth, fifth, sixth, or seventh possible implementation manner of the fifth aspect, in an eighth possible implementation manner, the sending unit is further configured to broadcast, to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

With reference to the fifth aspect or with reference to the first, second, third, fourth, fifth, sixth, seventh, or eighth possible implementation manner of the fifth aspect, in a ninth possible implementation manner, the receiving unit is further configured to receive scheduling termination information sent by the first scheduling server, and instruct the scheduling transmission unit to stop using a contention frequency band indicated in the scheduling termination information for scheduling transmission; or when duration in which the access point performs scheduling transmission by using the contention frequency band allocated by the first scheduling server reaches duration defined in the frequency band use time information of the contention frequency band that is applied for, the scheduling transmission unit is further configured to stop using the contention frequency band allocated by the first scheduling server for scheduling transmission.

With reference to the fifth aspect or with reference to the first, second, third, fourth, fifth, sixth, seventh, eighth, or ninth possible implementation manner of the fifth aspect, in a tenth possible implementation manner, the scheduling request further includes: frequency band range information of the contention frequency band that is applied for.

A sixth aspect of the embodiments provides an access point. The access point includes a receiving unit, configured to receive a contention frequency band that is allocated by a first scheduling server to the access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point. The access point also includes a scheduling transmission unit, configured to perform scheduling transmission by using the contention frequency band allocated by the first scheduling server.

In a first possible implementation manner of the sixth aspect, the scheduling transmission unit is further configured to send, to a station (STA) associated with the access point, data directly by using the allocated contention frequency band in scheduling indication information without listening on a channel; or instruct a station (STA) associated with the access point to switch from a contention access mode to a scheduling access mode, so that the station (STA) associated with the access point sends data to the access point directly by using the allocated contention frequency band in scheduling indication information without listening on a channel.

With reference to the sixth aspect or with reference to the first possible implementation manner of the sixth aspect, in a second possible implementation manner, the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity.

With reference to the sixth aspect or with reference to the first or second possible implementation manner of the sixth aspect, in a third possible implementation manner, if a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

With reference to the third possible implementation manner of the sixth aspect, in a fourth possible implementation manner, the frequency band range allocated in advance is determined by the decision server in at least one of the following manners: allocating different frequency bands to different access points; and allocating different time ranges for using a same frequency band to different access points.

In a fifth possible implementation manner of the sixth aspect, the access point further includes: a sending unit, configured to send a scheduling request to the first scheduling server according to a data transmission requirement, where the scheduling request includes frequency band bandwidth information of a contention frequency band that is applied for and frequency band use time information of the contention frequency band that is applied for, where the receiving unit is further configured to receive, within second preset duration, a contention frequency band that is allocated by the first scheduling server to the access point according to the spectrum list and the scheduling request, where the second preset duration is less than the first preset duration; and if the contention frequency band that is allocated by the first scheduling server to the access point according to the scheduling indication table and the spectrum list has been taken back by the first scheduling server, the scheduling transmission unit is further configured to perform scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, the scheduling transmission unit is further configured to perform scheduling transmission by using the contention frequency band that is allocated by the first scheduling server according to the scheduling indication table and the spectrum list and the contention frequency band that is allocated by the first scheduling server to the access point according to the spectrum list and the scheduling request.

A seventh aspect of the embodiments provides an access point. The access point includes a processor and a memory cooperating with the processor, where the memory is configured to store a set of program code, and the processor is configured to invoke the program code stored in the memory, and execute the method according to the first aspect of the present invention or any implementation manner of the first aspect, or the second aspect or any implementation manner of the second aspect.

An eighth aspect of the embodiments provides a scheduling server. The server includes a receiving unit, configured to receive a scheduling request that is sent by the access point according to a data transmission requirement, where the scheduling request includes frequency band bandwidth information of a contention frequency band that is applied for and frequency band use time information of the contention frequency band that is applied for. The server also includes a scheduling unit, configured to allocate a contention frequency band to the access point according to a spectrum list and the scheduling request, where the spectrum list includes at least frequency band use information and interference information of the access point. The server also includes a sending unit, configured to send a contention frequency band allocation result to the access point, so that the access point performs scheduling transmission by using the allocated contention frequency band.

In a first possible implementation manner of the eighth aspect, the scheduling request is initiated when the access point determines, according to the data transmission requirement, that data needs to be transmitted in a scheduling frequency band manner, which specifically includes: the scheduling request is initiated by the access point when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate.

With reference to the eighth aspect or with reference to the first possible implementation manner of the eighth aspect, in a second possible implementation manner, the interference information is acquired by the access point by listening on the channel and is reported to the scheduling server; or the interference information is obtained, through calculation, by the scheduling server according to location information of the access point and signal receiving and transmitting statuses of another access point that is a preset distance from the access point; and the interference information includes an interference source, an interference frequency band range, and interference intensity.

With reference to the eighth aspect or with reference to the first or second possible implementation manner of the eighth aspect, in a third possible implementation manner, the scheduling server further includes: an updating unit, configured to update the spectrum list after the contention frequency band allocation result is sent to the access point, and record the allocated contention frequency band and an allocated use time thereof.

With reference to the eighth aspect or with reference to the first, second, or third possible implementation manner of the eighth aspect, in a fourth possible implementation manner, if a management area of the scheduling server and a management area of another scheduling server have an overlapping area, and the access point is located in the overlapping area, after the receiving unit receives the scheduling request sent by the access point, the sending unit is further configured to send the scheduling request to a decision server, receive a decision result that is returned by the decision server after the decision server makes a decision, and forward the decision result to the access point, so that the access point performs scheduling transmission according to an allocated contention frequency band in the decision result, where a management area of each scheduling server is determined according to a spectrum list corresponding to each scheduling server, and the decision result is further used to inform the another scheduling server of the contention frequency band allocated by the decision server to the access point; or the scheduling unit is further configured to allocate a contention frequency band to the access point according to a frequency band range that is allocated in advance by a decision server.

With reference to the fourth possible implementation manner of the eighth aspect, in a fifth possible implementation manner, the allocated contention frequency band in the decision result is determined by the decision server in at least one of the following manners: allocating different frequency bands to different access points; and allocating different time ranges for using a same frequency band to different access points.

With reference to the third, fourth, or fifth possible implementation manner of the eighth aspect, in a sixth possible implementation manner, if the access point detects, in coverage thereof, another access point that is not connected to the scheduling server, the receiving unit is further configured to receive location information, coverage information, and information about an occupied contention frequency band of the another access point that are reported by the access point; and the updating unit is further configured to update the spectrum list and instruct the scheduling unit to perform contention frequency band scheduling according to an updated spectrum list.

With reference to the third, fourth, fifth, or sixth possible implementation manner of the eighth aspect, in a seventh possible implementation manner, the sending unit is further configured to send scheduling termination information to the access point, to instruct the access point to stop using a contention frequency band indicated in the scheduling termination information for scheduling transmission; or when duration in which the access point performs scheduling transmission by using the contention frequency band allocated by the scheduling server reaches duration defined in the frequency band use time information of the contention frequency band that is applied for, the scheduling unit is further configured to take back the allocated contention frequency band and instruct the updating unit to update the spectrum list.

With reference to the eighth aspect or with reference to the first, second, third, fourth, fifth, sixth, or seventh possible implementation manner of the eighth aspect, in an eighth possible implementation manner, the scheduling request further includes: frequency band range information of the contention frequency band that is applied for.

A ninth aspect of the embodiments provides a scheduling server. The server includes a scheduling unit, configured to allocate a contention frequency band to an access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point. The server also includes a sending unit, configured to send a contention frequency band allocation result to the access point, so that the access point performs scheduling transmission by using the allocated contention frequency band.

In a first possible implementation manner of the ninth aspect, the interference information is acquired by the access point by listening on the channel and is reported to the scheduling server; or the interference information is obtained, through calculation, by the scheduling server according to location information of the access point and signal receiving and transmitting statuses of another access point that is a preset distance from the access point; and the interference information includes an interference source, an interference frequency band range, and interference intensity.

With reference to the ninth aspect or with reference to the first possible implementation manner of the ninth aspect, in a second possible implementation manner, if a management area of the scheduling server and a management area of another scheduling server have an overlapping area, and the access point is located in the overlapping area, the contention frequency band allocated by the scheduling unit to the access point is in a frequency band range that is allocated in advance by a decision server.

With reference to the second possible implementation manner of the ninth aspect, in a third possible implementation manner, the frequency band range allocated in advance is determined by the decision server in at least one of the following manners: allocating different frequency bands to different access points; and allocating different time ranges for using a same frequency band to different access points.

With reference to the ninth aspect or with reference to the first, second, or third possible implementation manner of the ninth aspect, in a fourth possible implementation manner, the scheduling server further includes: a receiving unit, configured to receive a scheduling request that is sent by the access point according to a data transmission requirement, where the scheduling request includes frequency band bandwidth information of a contention frequency band that is applied for and frequency band use time information of the contention frequency band that is applied for, where the scheduling unit is further configured to allocate, within second preset duration, a contention frequency band to the access point according to the spectrum list and the scheduling request, where the second preset duration is less than the first preset duration; and if the contention frequency band that is allocated by the scheduling unit to the access point according to the scheduling indication table and the spectrum list has been taken back, instruct the access point to perform scheduling transmission by using the contention frequency band that is allocated by the scheduling unit to the access point according to the spectrum list and the scheduling request; or if the contention frequency band that is allocated by the scheduling unit to the access point according to the scheduling indication table and the spectrum list is not taken back, instruct the access point to perform scheduling transmission by using the contention frequency band that is allocated by the scheduling unit to the access point according to the scheduling indication table and the spectrum list and the contention frequency band that is allocated by the scheduling unit to the access point according to the spectrum list and the scheduling request.

A tenth aspect of the embodiments provides a scheduling server. The server includes a processor and a memory cooperating with the processor, where the memory is configured to store a set of program code, and the processor is configured to invoke the program code stored in the memory, and execute the method according to the third aspect or any implementation manner of the third aspect, or the fourth aspect or any implementation manner of the fourth aspect.

An eleventh aspect of the embodiments provides a scheduling system. The system includes at least one access point according to the fifth aspect or any implementation manner of the fifth aspect and at least one scheduling server according to the eighth aspect or any implementation manner of the eight aspect; or at least one access point according to the sixth aspect or any implementation manner of the sixth aspect and at least one scheduling server according to the ninth aspect or any implementation manner of the ninth aspect.

Implementing the embodiments of the present invention has the following beneficial effects: In a scenario in which a frequency band is shared and contention is allowed, by initiating a scheduling request to a scheduling server, an access point may apply for a public contention frequency band for scheduling transmission; the scheduling server then allocates a suitable contention frequency band to the access point according to actual usage of a contention frequency band resource and the scheduling request of the access point, thereby implementing addition of scheduling access to a contention access system. Therefore, scheduling access and contention access can coexist, and efficiency and compatibility of a wireless communications system are improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
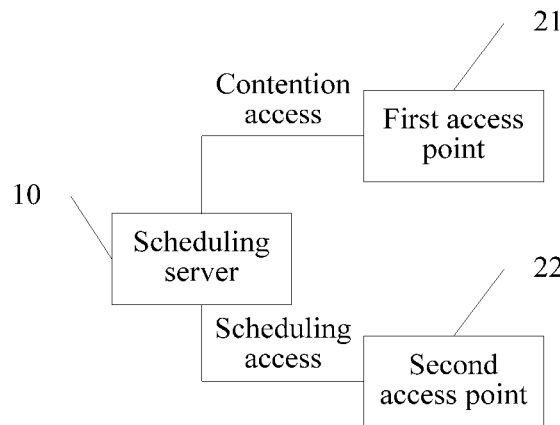
FIG. 1 is a schematic diagram of an application scenario of a scheduling method.

Referring to FIG. 1, FIG. 1 is a schematic diagram of an application scenario of a scheduling method. A first access point 21 and a second access point 22 are connected to a same scheduling server 10. At the beginning, both the first access point 21 and the second access point 22 contend, by means of contention access, for a frequency band to use. The contention access refers to that a transmit end first selects a channel and listens on the channel, and sends data to a receive end if the transmit end confirms that the channel is idle; and if sending of the data fails, the transmit end needs to give up sending data on the channel again. In such a case, the transmit end may listen on the channel again, or may no longer use the channel. Therefore, when multiple access points contend for channel accessing, a large quantity of collisions and delays are inevitable during a contention process. Especially when a quantity of access points or user terminals increases, such a situation is more serious, leading to relatively low channel utilization and relatively heavy system load. Data transmission requirements of the first access point 21 and the second access point 22 may be different, for example, service priorities, data capacities, data packet lengths, data rates, and the like may all be different in some degree; in this case, if a same channel access manner is still used to perform processing for the two access points, different data transmission requirements of different access points cannot be fully satisfied. Therefore, in embodiments, scheduling access is added to a contention access scenario, thereby achieving an effect of coexistence of scheduling access and contention access. A specific implementation manner is as follows.

Figure 2:
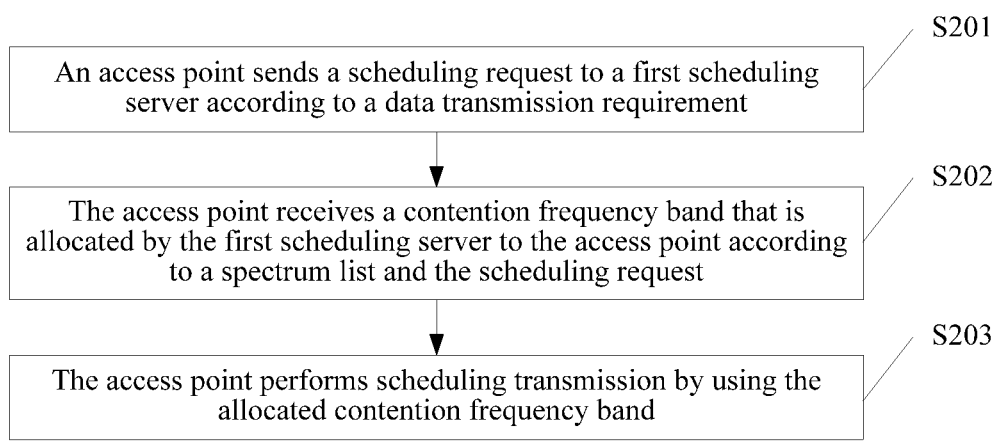
FIG. 2 is a schematic flowchart of a first embodiment of a scheduling method.

Referring to FIG. 2, FIG. 2 is a schematic flowchart of a first embodiment of a scheduling method. In this embodiment, the method includes the following steps.

S201: An access point sends a scheduling request to a first scheduling server according to a data transmission requirement.

Specifically, the access point needs to determine, according to the data transmission requirement, whether data is transmitted in a contention frequency band manner or a scheduling frequency band manner, and if data is transmitted in the scheduling frequency band manner, the access point sends the scheduling request to the first scheduling server.

When a service priority of the data transmission requirement is lower than a preset priority, or when a data capacity of the data transmission requirement is less than a preset capacity, or when a data packet length of the data transmission requirement is greater than a preset packet length, or when a data rate of the data transmission requirement is less than a preset rate, data is transmitted in the contention frequency band manner.

When a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate, data is transmitted in the scheduling frequency band manner.

Specifically, the scheduling request may include, but is not limited to, frequency band bandwidth information of a contention frequency band that is applied for and frequency band use time information of the contention frequency band that is applied for. By means of adding, to the scheduling request, the frequency band bandwidth information of the contention frequency band that is applied for, a frequency band bandwidth of the contention frequency band that the access point intends to apply for may be indicated; for example, it is possible that the access point intends to apply for a frequency band having a bandwidth of 20 MHz, 40 MHz, or the like. By means of adding, to the scheduling request, the frequency band use time information of the contention frequency band that is applied for, use duration within which the access point intends to use the contention frequency band that is applied for may be indicated; for example, it is possible that the access point intends to apply to use the contention frequency band for duration such as 20 ms or wo ms.

More preferably, the scheduling request may further include: frequency band range information of the contention frequency band that is applied for, so that the access point specifies a frequency band range of the contention frequency band that is applied for, where by means of adding, to the scheduling request, the frequency band range information of the contention frequency band that is applied for, a specific range of the contention frequency band that the access point intends to apply for may be indicated; for example, it is possible that the access point intends to apply to use a frequency band in a specific frequency band range such as 5350 MHz to 5390 MHz or 5150 MHz to 5170 MHz.

It should be noted that, multiple STAs may be connected to one access point; the access point and the multiple STAs connected thereto may form a basic service set (BSS for short). Certainly, the BSS may also exclude the access point, but include only the multiple STAs connected to the access point. The scheduling request may be proactively initiated by the access point, or a STA may send a scheduling requirement message to the access point, to trigger the access point to send the scheduling request to the first scheduling server. When initiating the scheduling request and specifying the frequency band range for scheduling of the contention frequency band that is applied for, the access point may specify partial frequency band of an operating contention frequency band of the BSS. This part of contention frequency band may operate in a contention access mode, or is allocated to a new STA that just join the BSS and that has not started to use this part of contention frequency band. Therefore, this part of contention frequency band may be specified for initiation of the scheduling request, and certainly, a new contention frequency band not overlapping the operating contention frequency band of the BSS may also be specified for application.

Corresponding to an existing dedicated scheduling frequency band, in this embodiment of the present invention, the contention frequency band for scheduling is a public frequency band that may be shared by multiple access points or station (STA)s or servers, and is generally a free frequency band; usually, access contention is required to use the contention frequency band.

The first scheduling server may be connected to multiple access points, and each access point may be further connected to multiple station STAs. If an access point supports frequency band scheduling, the access point may send a scheduling request to the first scheduling server when data needs to be transmitted, to apply for a public contention frequency band for scheduling transmission.

S202: The access point receives a contention frequency band that is allocated by the first scheduling server to the access point according to a spectrum list and the scheduling request.

The spectrum list includes at least frequency band use information and interference information of the access point.

Preferably, the spectrum list may further include identification information of another access point that is connected to the first scheduling server, interference information, and information about a contention frequency band and a scheduling frequency band that are being used by the another access point. The interference information may be acquired by the access point by listening on the channel and be reported to the first scheduling server; or the interference information may be obtained, through calculation, by the first scheduling server according to location information of the access point and signal receiving and transmitting statuses of another access point that is a preset distance from the access point. The interference information may include, but is not limited to, an interference source, an interference frequency band range, and interference intensity.

Preferably, the contention frequency band allocated by the first scheduling server to the access point is a contention frequency band that is determined by the first scheduling server, satisfies the scheduling request, is outside the interference frequency band range, and has interference intensity lower than a preset threshold.

Specifically, information about frequency bands that are being used by access points connected to the first scheduling server includes information about frequency bands, for contention access, being used by the access points connected to the first scheduling server, and further includes information about frequency bands, for scheduling access, being used by the access points connected to the first scheduling server. During contention frequency band scheduling, if the access point specifies only a frequency band bandwidth and a frequency band use time of the contention frequency band that is intended to apply for, but does not specify the frequency band range of the contention frequency band that is applied for, the first scheduling server may allocate, according to the spectrum list and with reference to the frequency band bandwidth information and the frequency band use time information that are carried in the scheduling request, a suitable contention frequency band to the access point for use. If the access point further specifies the frequency band range of the contention frequency band that is applied for, with reference to the spectrum list and the scheduling request, a contention frequency band that is required in the scheduling request of the access point may be selected preferentially for allocation. Certainly, if this cannot be satisfied due to an actual condition, allocation may also be performed according to the spectrum list.

Preferably, the spectrum list may further include: location information and coverage information of the access points connected to the first scheduling server. For example, a location of the first access point is (0, 0), and coverage thereof is 100 m; a location of the second access point is (0, 1), and coverage thereof is also 100 m. The second access point is an interference source of the first access point, where an interference frequency band range is from 5150 MHz to 5170 MHz, and intensity of interference of the second access point in a received signal of the first access point is −68 dBm. In this case, when a contention frequency band is scheduled for the first access point, with reference to the interference of the second access point, a contention frequency band that is out of the interference frequency band range and that has relatively low interference intensity may be allocated to the first access point preferentially, for example, a frequency band, which is in a range from 5350 MHz to 5390 MHz and of which interference intensity is −3 dBm, may be allocated to the first access point for use, so as to reduce interference and improve efficiency and accuracy of scheduling transmission. After one time of contention frequency band scheduling is completed, the first scheduling server needs to update the spectrum list, and record an allocated contention frequency band and an allocated use time thereof, so as to provide reference for next allocation and take back the allocated contention frequency band when the allocated use time expires.

Generally, if at least one of the frequency band use information, interference information, location information, and coverage information of the access point changes, the access point sends changed information to the first scheduling server, so that the first scheduling server updates the spectrum list.

S203: The access point performs scheduling transmission by using the allocated contention frequency band.

Specifically, after obtaining, by means of application, the contention frequency band that is allocated during contention frequency band scheduling, the access point may provide, to the STA for use according to a transmission requirement of a STA in a BSS, the contention frequency band that is allocated during contention frequency band scheduling, thereby implementing scheduling transmission and improving efficiency of a wireless communications system.

Specifically, the performing, by the access point, scheduling transmission by using the allocated contention frequency band may include: sending, by the access point to a station (STA) associated with the access point, data directly by using the allocated contention frequency band without listening on a channel; or instructing, by the access point, a station (STA) associated with the access point to switch from a contention access mode to a scheduling access mode, so that the station (STA) associated with the access point sends data to the access point directly by using the allocated contention frequency band without listening on a channel.

After obtaining the contention frequency band that is applied for, the access point may broadcast, to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

The station (STA) that is in the basic service set and that does not use the scheduling channel or that does not use the scheduling frequency band in which the scheduling channel is located may include: a station (STA) newly added to the basic service set, or a station (STA) that has been added to the basic service set but does not use the scheduling channel or the scheduling frequency band in which the scheduling channel is located.

In a possible scenario, with continuous development of the wireless communications system, network construction becomes increasingly complex, and quantities of scheduling servers, access points, and station (STA)s are ever increasing. As a result, a situation in which spectrum lists of two scheduling servers have an overlapping coverage area occurs inevitably. In this case, if the access point is located in the overlapping coverage area, when the access point sends a scheduling request to the first scheduling server, a decision server needs to be added to the wireless communications system, where the decision server may obtain the overlapping coverage area of the two scheduling servers by collecting statistics according to spectrum lists on the first scheduling server and a second scheduling server that are connected to the decision server, and then perform frequency band scheduling after making a decision on the scheduling request, which may specifically include: if a management area of the first scheduling server and a management area of the second scheduling server have an overlapping area, and the access point is located in the overlapping area, after sending the scheduling request to the first scheduling server, receiving, by the access point, a decision result returned by the decision server or receiving a decision result forwarded by the first scheduling server, and performing scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or after sending the scheduling request to the first scheduling server, receiving, by the access point, a contention frequency band that is allocated by the first scheduling server to the access point according to a frequency band range allocated in advance by the decision server, and performing scheduling transmission.

The allocated contention frequency band in the decision result is determined by the decision server in at least one of the following manners: allocating different frequency bands to different access points; and allocating different time ranges for using a same frequency band to different access points.

Certainly, a scheduling criterion of the decision server may also be enabling frequency bands that are used by neighboring access points belonging to different scheduling servers to coexist in a more advanced manner, for example, flexible soft frequency reuse, interference coordination, or interference alignment.

After the decision server is added, when multiple scheduling servers have an overlapping coverage area geographically, a problem of conflict that occurs when an access point in the overlapping coverage area requests a contention frequency band can be resolved.

In another possible scenario, if the access point detects, in coverage thereof, another access point that is not connected to the first scheduling server, the access point reports location information, coverage information, and information about an occupied contention frequency band that are of the detected another access point to the first scheduling server, so that the first scheduling server updates the spectrum list and performs contention frequency band scheduling according to an updated spectrum list.

The another access point may be a conventional access point that does not support scheduling transmission, but it can contend for access and occupy a frequency band; or the another access point may be an access point that supports scheduling transmission but that is connected to another scheduling server. However, because the another access point is located in the coverage of the access point that is connected to the first scheduling server, an occupied contention frequency band has impact on scheduling transmission performed by the access point, and may further interfere the access point. Therefore, if the access point detects another access point like this, the access point needs to report information about the another access point to the first scheduling server, to add the information to the spectrum list of the first scheduling server, thereby being compatible with the another access point and a BSS or STA connected to the another access point. In this way, impact on application by the access point to use a contention frequency band as a scheduling frequency band can be reduced, and compatibility with another conventional access point that does not support scheduling transmission and that is connected to another scheduling server is also achieved.

When the allocated contention frequency band needs to be stopped being used for scheduling transmission, the method may include: receiving, by the access point, scheduling termination information sent by the first scheduling server, and stopping using a contention frequency band indicated in the scheduling termination information for scheduling transmission.

Specifically, the first scheduling server may send, according to states of using scheduled contention frequency bands by all access points connected to the first scheduling server and different degrees of requirements on contention frequency band scheduling of all the access points, the scheduling termination information to an access point of which scheduling transmission is complete but a use time of the contention frequency band that is applied for does not expire or a requirement on contention frequency band scheduling is relatively low. After receiving the scheduling termination information sent by the first scheduling server, the access point stops using the contention frequency band indicated in the scheduling termination information for scheduling transmission, so that the first scheduling server takes back a frequency band resource and updates the spectrum list, thereby improving utilization of the frequency band resource. Certainly, in this case, the access point can no longer perform scheduling transmission on the contention frequency band, but can still choose to continue to use the contention frequency band according to a contention access mode; moreover, the access point needs to notify usage of the contention frequency band to the first scheduling server.

Certainly, when duration in which the access point performs scheduling transmission by using the contention frequency band allocated by the first scheduling server reaches duration defined in the frequency band use time information of the contention frequency band that is applied for, the access point may also stop using the contention frequency band allocated by the first scheduling server for scheduling transmission. In addition to that the first scheduling server performs centralized management and delivers the scheduling termination information, when the frequency band use time of the contention frequency band that is applied for expires, the access point may also automatically stop using the contention frequency band, of which the frequency band use time expires, for scheduling transmission. Then, the first scheduling server takes back the frequency band resource and updates the spectrum list. Certainly, in this case, the access point can no longer perform scheduling transmission on the contention frequency band, but can still choose to continue to use the contention frequency band according to a contention access mode; moreover, the access point needs to notify usage of the contention frequency band to the first scheduling server.

That is, in addition to that the first scheduling server performs centralized management and delivers the scheduling termination information, when the frequency band use time of the contention frequency band that is applied for expires, the access point may also automatically stop using the contention frequency band, of which the frequency band use time expires, for scheduling transmission. Then, the first scheduling server takes back the frequency band resource and updates the spectrum list. Certainly, in this case, the access point can no longer perform scheduling transmission on the contention frequency band, but can still choose to continue to use the contention frequency band according to a contention access mode; moreover, the access point needs to notify usage of the contention frequency band to the first scheduling server.

The two manners of terminating contention frequency band scheduling in the foregoing may be properly selected according to specific usage of a contention frequency band, so as to improve system applicability.

It should be noted that, before the access point initiates the scheduling request, the method may further include: receiving, by the access point, a scheduling requirement message of a station (STA) that is connected to the access point.

The station (STA) that is connected to the access point sends the scheduling requirement message to the access point, thereby triggering contention frequency band scheduling.

In this embodiment, in a scenario in which a frequency band is shared and contention is allowed, by initiating a scheduling request to a scheduling server, an access point may apply for a public contention frequency band for scheduling transmission; the scheduling server then allocates a suitable contention frequency band to the access point according to actual usage of a contention frequency band resource and the scheduling request of the access point, thereby implementing addition of scheduling access to a contention access system. Therefore, scheduling access and contention access can coexist, and the efficiency and compatibility of a wireless communications system are improved.

Figure 3:
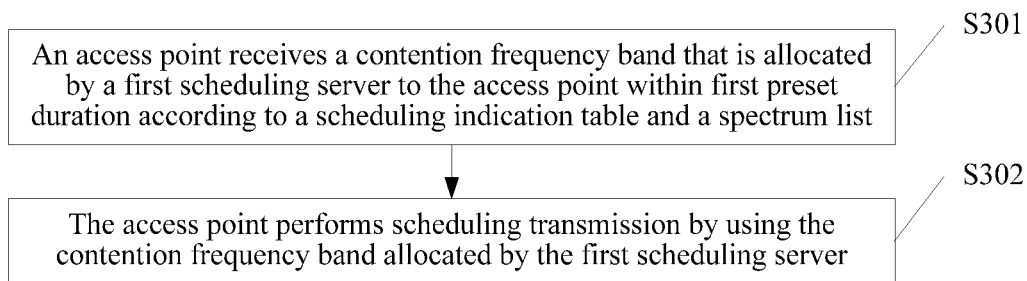
FIG. 3 is a schematic flowchart of a second embodiment of a scheduling method.

Referring to FIG. 3, FIG. 3 is a schematic flowchart of a second embodiment of a scheduling method. In this embodiment, the method includes the following steps.

S301: An access point receives a contention frequency band that is allocated by a first scheduling server to the access point within first preset duration according to a scheduling indication table and a spectrum list.

The scheduling indication table includes capability indication information about whether the access point supports scheduling transmission and information about a scheduling bandwidth supported by the access point, and the spectrum list includes frequency band use information and interference information of the access point.

Capability indication information of each access point may help the first scheduling server know whether the access point supports scheduling transmission, and scheduling bandwidth information of each access point may help the first scheduling server know a maximum frequency band bandwidth for scheduling supported by the access point. With reference to the spectrum list, the first scheduling server can proactively schedule a contention frequency band for each access point.

Certainly, a bandwidth of the contention frequency band scheduled by the first scheduling server for each access point is less than or equal to a scheduling bandwidth supported by the access point.

Preferably, the interference information may be acquired by the access point by listening on the channel and be reported to the first scheduling server; or the interference information may also be obtained, through calculation, by the first scheduling server according to location information of the access point and signal receiving and transmitting statuses of another access point that is a preset distance from the access point; and the interference information may include, but is not limited to, an interference source, an interference frequency band range, and interference intensity.

By means of allocation according to preset duration, periodic contention frequency band scheduling can be implemented, and a scheduling period may be set according to a specific status of a service borne by each access point.

S302: The access point performs scheduling transmission by using the contention frequency band allocated by the first scheduling server.

After receiving the allocated contention frequency band, the access point may provide, according to a transmission requirement of a STA in a BSS, the allocated contention frequency band for the STA to use, thereby implementing scheduling transmission, and improving efficiency of a wireless communications system.

Specifically, the performing, by the access point, scheduling transmission by using the contention frequency band allocated by the first scheduling server may include: sending, by the access point to a station (STA) associated with the access point, data directly by using the allocated contention frequency band in scheduling indication information without listening on a channel; or instructing, by the access point, a station (STA) associated with the access point to switch from a contention access mode to a scheduling access mode, so that the station (STA) associated with the access point sends data to the access point directly by using the allocated contention frequency band in scheduling indication information without listening on a channel.

Preferably, the scheduling indication table may further include: location information of station (STA)s that are connected to access points and that support scheduling transmission, and information about scheduling bandwidths supported by the station (STA)s that are connected to the access points and that support scheduling transmission, where a STA may proactively send information to a corresponding access point to report location information and scheduling bandwidth information of the station (STA), and then the access point sends the location information and scheduling bandwidth information to the first scheduling server; or the access point may collect information of the STA in real time or periodically, and then send the information to the first scheduling server.

In a possible scenario, if a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

The frequency band range allocated in advance is determined by the decision server in at least one of the following manners: allocating different frequency bands to different access points; and allocating different time ranges for using a same frequency band to different access points.

To sum up, the access point receives a contention frequency band that is proactively allocated by the first scheduling server, and performs scheduling transmission by using the allocated contention frequency band. In this way, the first scheduling server can perform global allocation according to frequency band resources, thereby scheduling contention frequency bands more properly and globally.

In another possible scenario, reference may be made to the first embodiment and the second embodiment of the scheduling method. Specifically, after receiving the contention frequency band that is allocated by the first scheduling server to the access point within the first preset duration according to the scheduling indication table and the spectrum list, the access point may further proactively initiate a scheduling request within the first preset duration, which may specifically include: sending, by the access point, the scheduling request to the first scheduling server according to a data transmission requirement, where the scheduling request includes frequency band bandwidth information of a contention frequency band that is applied for and frequency band use time information of the contention frequency band that is applied for; receiving, by the access point within second preset duration, a contention frequency band that is allocated by the first scheduling server to the access point according to the spectrum list and the scheduling request, where the second preset duration is less than the first preset duration; and if the contention frequency band that is allocated by the first scheduling server to the access point according to the scheduling indication table and the spectrum list has been taken back by the first scheduling server, performing, by the access point, scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, performing, by the access point, scheduling transmission by using the contention frequency band that is allocated by the first scheduling server according to the scheduling indication table and the spectrum list and the contention frequency band that is allocated by the first scheduling server to the access point according to the spectrum list and the scheduling request.

Certainly, after acquiring a new contention frequency band by proactively initiating a request, the access point may no longer use the scheduling frequency band that is initially allocated by the first scheduling server, but use only the contention frequency band that is acquired by proactively initiating the request, to perform scheduling transmission.

It can be known from the foregoing description that, a manner in which the first scheduling server schedules contention frequency bands and a manner in which the access point proactively initiates a scheduling request to apply for contention frequency band scheduling may coexist, or may exist independent of each other. When the two manners coexist, the access point may initiate a scheduling request at any moment. For example, the access point may immediately apply again when a use time of a frequency band that is previously applied for expires, or apply again in a period after the first scheduling server allocates a contention frequency band. Therefore, the first preset duration within which the first scheduling server allocates a contention frequency band may be set to be relatively long. Generally, the first preset duration is longer than the second preset duration. When the two manners coexist, that the access point proactively initiates a scheduling request may be considered as a resource requirement modification that is made based on periodic allocation performed by the first scheduling server.

Figure 4:
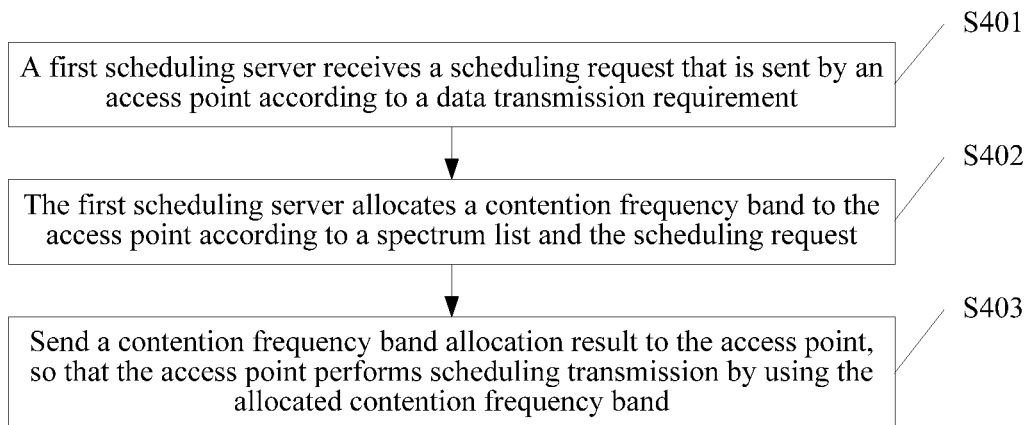
FIG. 4 is a schematic flowchart of a third embodiment of a scheduling method.

Referring to FIG. 4, FIG. 4 is a schematic flowchart of a third embodiment of a scheduling method. In this embodiment, the method includes the following steps.

S401: A first scheduling server receives a scheduling request that is sent by an access point according to a data transmission requirement.

Specifically, the first scheduling server may be connected to multiple access points, and each access point may be further connected to multiple station STAs. If an access point supports frequency band scheduling, the access point may send a scheduling request to the first scheduling server when data needs to be transmitted, to apply for a public contention frequency band for scheduling transmission.

Specifically, the scheduling request may include, but is not limited to, frequency band bandwidth information of a contention frequency band that is applied for and frequency band use time information of the contention frequency band that is applied for. By means of adding, to the scheduling request, the frequency band bandwidth information of the contention frequency band that is applied for, a frequency band bandwidth of the contention frequency band that the access point intends to apply for may be indicated; for example, it is possible that the access point intends to apply for a frequency band having a bandwidth of 20 MHz, 40 MHz, or the like. By means of adding, to the scheduling request, the frequency band use time information of the contention frequency band that is applied for, use duration within which the access point intends to use the contention frequency band that is applied for may be indicated; for example, it is possible that the access point intends to apply to use the contention frequency band for duration such as 20 ms or 100 ms.

More preferably, the scheduling request may further include: frequency band range information of the contention frequency band that is applied for, so that the access point specifies a frequency band range of the contention frequency band that is applied for, where by means of adding, to the scheduling request, the frequency band range information of the contention frequency band that is applied for, a specific range of the contention frequency band that the access point intends to apply for may be indicated; for example, it is possible that the access point intends to apply to use a frequency band in a specific frequency band range such as 5350 MHz to 5390 MHz or 5150 MHz to 5170 MHz.

The scheduling request is initiated when the access point determines, according to the data transmission requirement, that data needs to be transmitted in a scheduling frequency band manner, which specifically includes: the scheduling request is initiated by the access point when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate.

S402: The first scheduling server allocates a contention frequency band to the access point according to a spectrum list and the scheduling request.

The spectrum list includes at least frequency band use information and interference information of the access point.

Preferably, the spectrum list may further include identification information of another access point that is connected to the first scheduling server, interference information, and information about a contention frequency band and a scheduling frequency band that are being used by the another access point. The interference information may be acquired by the access point by listening on the channel and be reported to the first scheduling server; or the interference information may be obtained, through calculation, by the first scheduling server according to location information of the access point and signal receiving and transmitting statuses of another access point that is a preset distance from the access point. The interference information may include, but is not limited to, an interference source, an interference frequency band range, and interference intensity.

Preferably, the contention frequency band allocated by the first scheduling server to the access point is a contention frequency band that is determined by the first scheduling server, satisfies the scheduling request, is outside the interference frequency band range, and has interference intensity lower than a preset threshold.

Specifically, information about frequency bands that are being used by access points connected to the first scheduling server includes information about frequency bands, for contention access, being used by the access points connected to the first scheduling server, and further includes information about frequency bands, for scheduling access, being used by the access points connected to the first scheduling server. During contention frequency band scheduling, if the access point specifies only a frequency band bandwidth and a frequency band use time of the contention frequency band that is intended to apply for, but does not specify the frequency band range of the contention frequency band that is applied for, the first scheduling server may allocate, according to the spectrum list and with reference to the frequency band bandwidth information and the frequency band use time information that are carried in the scheduling request, a suitable contention frequency band to the access point for use. If the access point further specifies the frequency band range of the contention frequency band that is applied for, with reference to the spectrum list and the scheduling request, a contention frequency band that is required in the scheduling request of the access point may be selected preferentially for allocation. Certainly, if this cannot be satisfied due to an actual condition, allocation may also be performed according to the spectrum list.

Preferably, the spectrum list may further include: location information and coverage information of the access points connected to the first scheduling server. For example, a location of the first access point is (0, 0), and coverage thereof is 100 m; a location of the second access point is (0, 1), and coverage thereof is also 100 m. The second access point is an interference source of the first access point, where an interference frequency band range is from 5150 MHz to 5170 MHz, and intensity of interference of the second access point in a received signal of the first access point is −68 dBm. In this case, when a contention frequency band is scheduled for the first access point, with reference to the interference of the second access point, a contention frequency band that is out of the interference frequency band range and that has relatively low interference intensity may be allocated to the first access point preferentially, for example, a frequency band, which is in a range from 5350 MHz to 5390 MHz and of which interference intensity is −3 dBm, may be allocated to the first access point for use, so as to reduce interference and improve efficiency and accuracy of scheduling transmission. After one time of contention frequency band scheduling is completed, the first scheduling server needs to update the spectrum list, and record an allocated contention frequency band and an allocated use time thereof, so as to provide reference for next allocation and take back the allocated contention frequency band when the allocated use time expires.

S403: Send a contention frequency band allocation result to the access point, so that the access point performs scheduling transmission by using the allocated contention frequency band.

After the sending a contention frequency band allocation result to the access point, the method further includes: updating, by the first scheduling server, the spectrum list, and recording the allocated contention frequency band and an allocated use time thereof.

In a possible scenario, if a management area of the first scheduling server and a management area of a second scheduling server have an overlapping area, and the access point is located in the overlapping area, after the first scheduling server receives the scheduling request sent by the access point, the first scheduling server sends the scheduling request to a decision server, receives a decision result that is returned by the decision server after the decision server makes a decision, and forwards the decision result to the access point, so that the access point performs scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or the first scheduling server allocates a contention frequency band to the access point according to a frequency band range that is allocated in advance by a decision server.

The allocated contention frequency band in the decision result is determined by the decision server in at least one of the following manners: allocating different frequency bands to different access points; and allocating different time ranges for using a same frequency band to different access points.

In another possible scenario, if the access point detects, in coverage thereof, another access point that is not connected to the first scheduling server, the first scheduling server receives location information, coverage information, and information about an occupied contention frequency band that are of the detected another access point and that are reported by the access point; and the first scheduling server updates the spectrum list and performs contention frequency band scheduling according to an updated spectrum list.

When the allocated contention frequency band needs to be stopped being used for scheduling transmission, the first scheduling server may send scheduling termination information to the access point, to instruct the access point to stop using a contention frequency band indicated in the scheduling termination information for scheduling transmission; or when duration in which the access point performs scheduling transmission by using the contention frequency band allocated by the first scheduling server reaches duration defined in the frequency band use time information of the contention frequency band that is applied for, the first scheduling server takes back the allocated contention frequency band and updates the spectrum list.

Figure 5:
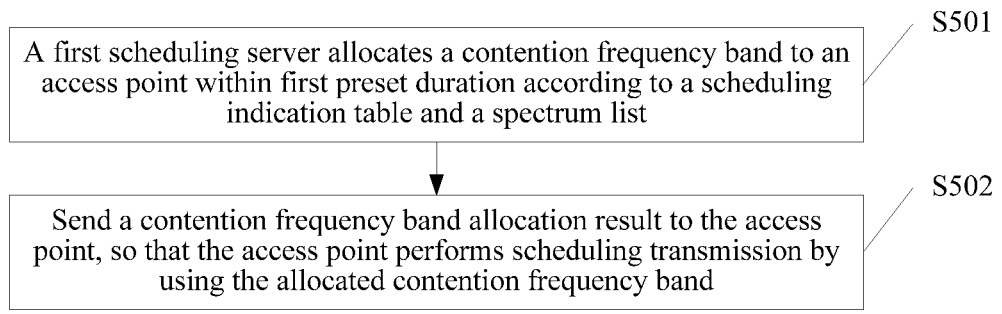
FIG. 5 is a schematic flowchart of a fourth embodiment of a scheduling method.

Referring to FIG. 5, FIG. 5 is a schematic flowchart of a fourth embodiment of a scheduling method. In this embodiment, the method includes the following steps.

S501: A first scheduling server allocates a contention frequency band to an access point within first preset duration according to a scheduling indication table and a spectrum list.

The scheduling indication table includes capability indication information about whether the access point supports scheduling transmission and information about a scheduling bandwidth supported by the access point, and the spectrum list includes frequency band use information and interference information of the access point.

The interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity.

Preferably, the scheduling indication table may further include: location information of station (STA)s that are connected to access points and that support scheduling transmission, and information about scheduling bandwidths supported by the station (STA)s that are connected to the access points and that support scheduling transmission, where a STA may proactively send information to a corresponding access point to report location information and scheduling bandwidth information of a station (STA), and then the access point sends the location information and scheduling bandwidth information to the first scheduling server; or the access point may collect information of the STA in real time or periodically, and then send the information to the first scheduling server.

By means of allocation according to preset duration, periodic contention frequency band scheduling can be implemented, and a scheduling period may be set according to a specific status of a service borne by each access point.

S502: Send a contention frequency band allocation result to the access point, so that the access point performs scheduling transmission by using the allocated contention frequency band.

In a possible scenario, if a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

The frequency band range allocated in advance is determined by the decision server in at least one of the following manners: allocating different frequency bands to different access points; and allocating different time ranges for using a same frequency band to different access points.

To sum up, the first scheduling server allocates a contention frequency band to the access point, so that the access point performs scheduling transmission by using the allocated contention frequency band. In this way, the first scheduling server can perform global allocation according to frequency band resources, thereby scheduling contention frequency bands more properly and globally.

In another possible scenario, reference may be made to the fourth embodiment and the third embodiment of the scheduling method according to the present invention. Specifically, after the first scheduling server allocates the contention frequency band to the access point within the first preset duration according to the scheduling indication table and the spectrum list, the first scheduling server may further receive a scheduling request that is sent by the access point according to a data transmission requirement, and allocate a contention frequency band to the access point, which may specifically include: receiving, by the first scheduling server, the scheduling request that is sent by the access point according to the data transmission requirement, where the scheduling request includes frequency band bandwidth information of a contention frequency band that is applied for and frequency band use time information of the contention frequency band that is applied for; allocating, by the first scheduling server within second preset duration, the contention frequency band to the access point according to the spectrum list and the scheduling request, where the second preset duration is less than the first preset duration; and if the contention frequency band that is allocated by the first scheduling server to the access point according to the scheduling indication table and the spectrum list has been taken back by the first scheduling server, instructing the access point to perform scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, instructing the access point to perform scheduling transmission by using the contention frequency band that is allocated by the first scheduling server according to the scheduling indication table and the spectrum list and the contention frequency band that is allocated by the first scheduling server to the access point according to the spectrum list and the scheduling request.

Figure 6:
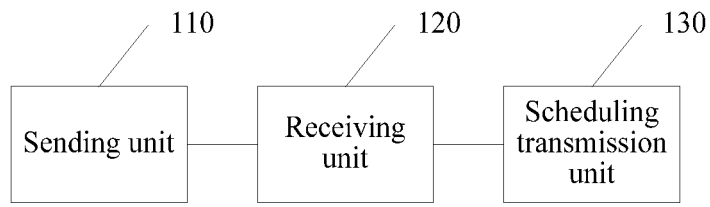
FIG. 6 is a schematic composition diagram of a first embodiment of an access point.

Referring to FIG. 6, FIG. 6 is a schematic composition diagram of a first embodiment of an access point, where the access point includes: a sending unit no, configured to send a scheduling request to a first scheduling server according to a data transmission requirement, where the scheduling request includes frequency band bandwidth information of a contention frequency band that is applied for and frequency band use time information of the contention frequency band that is applied for, and preferably, the scheduling request may further include frequency band range information of the contention frequency band that is applied for. The access point also includes a receiving unit 120, configured to receive a contention frequency band that is allocated by the first scheduling server to the access point according to a spectrum list and the scheduling request, where the spectrum list includes at least frequency band use information and interference information of the access point; the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity; and a scheduling transmission unit 130, configured to perform scheduling transmission by using the allocated contention frequency band.

The sending unit no is further configured to: determine, according to the data transmission requirement, whether data is transmitted in a contention frequency band manner or a scheduling frequency band manner, and if data is transmitted in the scheduling frequency band manner, send the scheduling request to the first scheduling server.

The sending unit 110 is further configured to: when a service priority of the data transmission requirement is lower than a preset priority, or when a data capacity of the data transmission requirement is less than a preset capacity, or when a data packet length of the data transmission requirement is greater than a preset packet length, or when a data rate of the data transmission requirement is less than a preset rate, transmit data in the contention frequency band manner; or when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate, transmit data in the scheduling frequency band manner.

The scheduling transmission unit 130 is specifically configured to send, to a station (STA) associated with the access point, data directly by using the allocated contention frequency band without listening on a channel; or instruct a station (STA) associated with the access point to switch from a contention access mode to a scheduling access mode, so that the station (STA) associated with the access point sends data to the access point directly by using the allocated contention frequency band without listening on a channel.

If a management area of the first scheduling server and a management area of a second scheduling server have an overlapping area, and the access point is located in the overlapping area, after the sending unit no sends the scheduling request to the first scheduling server, the receiving unit 120 is further configured to receive a decision result returned by a decision server or receive a decision result forwarded by the first scheduling server, and the scheduling transmission unit 130 is further configured to perform scheduling transmission according to an allocated contention frequency band in the decision result, where a management area of each scheduling server is determined according to a spectrum list corresponding to each scheduling server, and the decision result is further used to inform the second scheduling server of the contention frequency band allocated by the decision server to the access point; or after the sending unit no sends the scheduling request to the first scheduling server, the receiving unit 120 is further configured to: receive a contention frequency band that is allocated by the first scheduling server to the access point according to a frequency band range allocated in advance by a decision server, and instruct the scheduling transmission unit 130 to perform scheduling transmission.

The allocated contention frequency band in the decision result is determined by the decision server in at least one of the following manners: allocating different frequency bands to different access points; and allocating different time ranges for using a same frequency band to different access points.

Preferably, the access point may further include: a monitoring unit, configured to: if another access point that is not connected to the first scheduling server is detected in coverage of the access point, report location information, coverage information, and information about an occupied contention frequency band that are of the detected another access point to the first scheduling server, so that the first scheduling server updates the spectrum list and performs contention frequency band scheduling according to an updated spectrum list.

The sending unit no is further configured to broadcast, to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

The receiving unit 120 is further configured to receive scheduling termination information sent by the first scheduling server, and instruct the scheduling transmission unit 130 to stop using a contention frequency band indicated in the scheduling termination information for scheduling transmission; or when duration in which the access point performs scheduling transmission by using the contention frequency band allocated by the first scheduling server reaches duration defined in the frequency band use time information of the contention frequency band that is applied for, the scheduling transmission unit 130 is further configured to stop using the contention frequency band allocated by the first scheduling server for scheduling transmission.

The sending unit no may serve as a transmitter of the access point, the receiving unit 120 may serve as a receiver of the access point, and the scheduling transmission unit 130 may serve as a processor of the access point, to correspondingly implement various operations in this embodiment.

Figure 7:
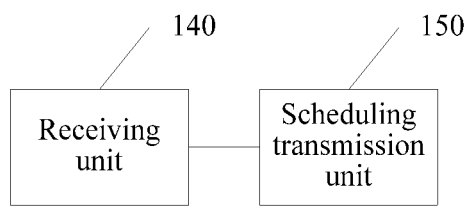
FIG. 7 is a schematic composition diagram of a second embodiment of an access point.

Referring to FIG. 7, FIG. 7 a schematic composition diagram of a second embodiment of an access point. The access point includes: a receiving unit 140, configured to receive a contention frequency band that is allocated by a first scheduling server to the access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point; the interference information is acquired by the access point by listening on the channel and is reported to the first scheduling server; or the interference information is obtained, through calculation, by the first scheduling server according to location information of the access point and signal receiving and transmitting statuses of another access point that is a preset distance from the access point; and the interference information includes an interference source, an interference frequency band range, and interference intensity; and a scheduling transmission unit 150, configured to perform scheduling transmission by using the contention frequency band allocated by the first scheduling server.

The scheduling transmission unit 150 is further configured to send, to a station (STA) associated with the access point, data directly by using the allocated contention frequency band in scheduling indication information without listening on a channel; or instruct a station (STA) associated with the access point to switch from a contention access mode to a scheduling access mode, so that the station (STA) associated with the access point sends data to the access point directly by using the allocated contention frequency band in scheduling indication information without listening on a channel.

If a management area of the first scheduling server and a management area of a second scheduling server have an overlapping area, and the access point is located in the overlapping area, the contention frequency band allocated by the first scheduling server to the access point is in a frequency band range that is allocated in advance by a decision server.

The frequency band range allocated in advance is determined by the decision server in at least one of the following manners: allocating different frequency bands to different access points; and allocating different time ranges for using a same frequency band to different access points.

Preferably, the access point may further include: a sending unit, configured to send a scheduling request to the first scheduling server according to a data transmission requirement, where the scheduling request includes frequency band bandwidth information of a contention frequency band that is applied for and frequency band use time information of the contention frequency band that is applied for.

The receiving unit 140 is further configured to receive, within second preset duration, a contention frequency band that is allocated by the first scheduling server to the access point according to the spectrum list and the scheduling request, where the second preset duration is less than the first preset duration; and if the contention frequency band that is allocated by the first scheduling server to the access point according to the scheduling indication table and the spectrum list has been taken back by the first scheduling server, the scheduling transmission unit 150 is further configured to perform scheduling transmission by using the contention frequency band that is allocated by the first scheduling server to the access point according to the spectrum list and the scheduling request; or if the contention frequency band that is allocated by the first scheduling server to the access point according to the scheduling indication table and the spectrum list is not taken back by the first scheduling server, the scheduling transmission unit 150 is further configured to perform scheduling transmission by using the contention frequency band that is allocated by the first scheduling server according to the scheduling indication table and the spectrum list and the contention frequency band that is allocated by the first scheduling server to the access point according to the spectrum list and the scheduling request.

It should be noted that, the foregoing scheduling transmission unit may be separately set in a form of hardware independently of a processor of the access point, and may be set in a form of a microprocessor; or may be embedded in a processor of the access point in a form of hardware; or may also be stored in a memory of the access point in a form of software, so that the processor of the access point invokes the scheduling transmission unit to perform operations corresponding to the scheduling transmission unit.

For example, in the second embodiment of the access point (the embodiment shown in FIG. 7), the receiving unit 140 may serve as a receiver of the access point, and the scheduling transmission unit 150 may serve as a processor of the access point, to correspondingly implement various operations in this embodiment.

For another example, in the first embodiment of the access point (the embodiment shown in FIG. 6), the scheduling transmission unit 130 may be a processor of the access point, and functions of the sending unit no and the receiving unit 120 may be embedded in the processor. In addition, the monitoring unit and the scheduling transmission unit 130 may be separately set independently of the processor, or may be embedded in the processor, or may also be stored in a memory in a form of software, so as to be invoked by the processor to implement functions thereof.

Certainly, the sending unit no and the receiving unit 120 may also respectively serve as a transmitter and a receiver of the access point, and may be integrated with the scheduling transmission unit 130 or the monitoring unit or may also be set independently, which is not limited in this embodiment of the present invention. The foregoing processor may be a central processing unit (CPU), a microprocessor, a single-chip microcomputer, or the like.

Figure 8:
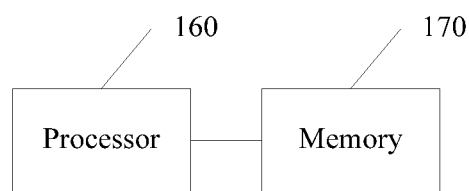
FIG. 8 is a schematic composition diagram of a third embodiment of an access point.

Referring to FIG. 8, FIG. 8 is a schematic composition diagram of a third embodiment of an access point. In this embodiment, the access point includes: a processor 160 and a memory 170 cooperating with the processor 160.

The memory 170 is configured to store a set of program code, and the processor 160 is configured to invoke the program code stored in the memory 170, to perform the operations in either of the first and second embodiments of the scheduling method.

Figure 9:
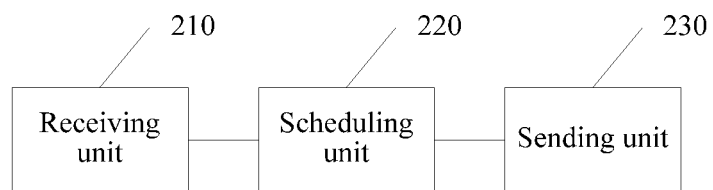
FIG. 9 is a schematic composition diagram of a first embodiment of a scheduling server.

Referring to FIG. 9, FIG. 9 is a schematic composition diagram of a first embodiment of a scheduling server. The scheduling server includes: a receiving unit 210, configured to receive a scheduling request that is sent by an access point according to a data transmission requirement, where the scheduling request includes frequency band bandwidth information of a contention frequency band that is applied for and frequency band use time information of the contention frequency band that is applied for, and preferably, the scheduling request may further include frequency band range information of the contention frequency band that is applied for. The server also includes a scheduling unit 220, configured to allocate a contention frequency band to the access point according to a spectrum list and the scheduling request, where the spectrum list includes at least frequency band use information and interference information of the access point; and the interference information is acquired by the access point by listening on the channel and is reported to the scheduling server; or the interference information is obtained, through calculation, by the scheduling server according to location information of the access point and signal receiving and transmitting statuses of another access point that is a preset distance from the access point; and the interference information includes an interference source, an interference frequency band range, and interference intensity. The server also includes a sending unit 230, configured to send a contention frequency band allocation result to the access point, so that the access point performs scheduling transmission by using the allocated contention frequency band.

The scheduling request is initiated when the access point determines, according to the data transmission requirement, that data needs to be transmitted in a scheduling frequency band manner, which specifically includes: the scheduling request is initiated by the access point when a service priority of the data transmission requirement is higher than or equal to a preset priority, or when a data capacity of the data transmission requirement is greater than or equal to a preset capacity, or when a data packet length of the data transmission requirement is less than a preset packet length, or when a data rate of the data transmission requirement is greater than a preset rate.

Preferably, the scheduling server may further include: an updating unit, configured to update the spectrum list after the contention frequency band allocation result is sent to the access point, and record the allocated contention frequency band and an allocated use time thereof.

If a management area of the scheduling server and a management area of another scheduling server have an overlapping area, and the access point is located in the overlapping area, after the receiving unit 210 receives the scheduling request sent by the access point, the sending unit 230 is further configured to send the scheduling request to a decision server, receive a decision result that is returned by the decision server after the decision server makes a decision, and forward the decision result to the access point, so that the access point performs scheduling transmission according to an allocated contention frequency band in the decision result, where a management area of each scheduling server is determined according to a spectrum list corresponding to each scheduling server, and the decision result is further used to inform the another scheduling server of the contention frequency band allocated by the decision server to the access point; or the scheduling unit 220 is further configured to allocate a contention frequency band to the access point according to a frequency band range that is allocated in advance by a decision server.

The allocated contention frequency band in the decision result is determined by the decision server in at least one of the following manners: allocating different frequency bands to different access points; and allocating different time ranges for using a same frequency band to different access points.

If the access point detects, in coverage thereof, another access point that is not connected to the scheduling server, the receiving unit 210 is further configured to receive location information, coverage information, and information about an occupied contention frequency band of the another access point that are reported by the access point; and the updating unit is further configured to update the spectrum list and instruct the scheduling unit 220 to perform contention frequency band scheduling according to an updated spectrum list.

The sending unit 230 is further configured to send scheduling termination information to the access point, to instruct the access point to stop using a contention frequency band indicated in the scheduling termination information for scheduling transmission; or when duration in which the access point performs scheduling transmission by using the contention frequency band allocated by the scheduling server reaches duration defined in the frequency band use time information of the contention frequency band that is applied for, the scheduling unit 220 is further configured to take back the allocated contention frequency band and instruct the updating unit to update the spectrum list.

The receiving unit 210 may serve as a receiver of the access point, the scheduling unit 220 may serve as a processor of the access point, and the sending unit 230 may serve as a transmitter of the access point, to correspondingly implement various operations in this embodiment.

Figure 10:
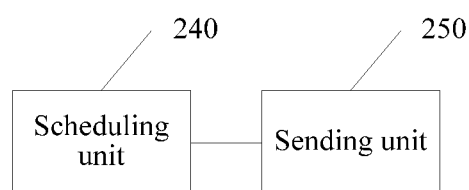
FIG. 10 is a schematic composition diagram of a second embodiment of a scheduling server.

Referring to FIG. 10, FIG. 10 is a schematic composition diagram of a second embodiment of a scheduling server. The scheduling server includes: a scheduling unit 240, configured to allocate a contention frequency band to an access point within first preset duration according to a scheduling indication table and a spectrum list, where the scheduling indication table includes capability indication information about whether the access point supports scheduling transmission and information about a scheduling bandwidth supported by the access point, and the spectrum list includes frequency band use information and interference information of the access point; the interference information is acquired by the access point by listening on the channel and is reported to the scheduling server; or the interference information is obtained, through calculation, by the scheduling server according to location information of the access point and signal receiving and transmitting statuses of another access point that is a preset distance from the access point; and the interference information includes an interference source, an interference frequency band range, and interference intensity. Also included isa sending unit 250, configured to send a contention frequency band allocation result to the access point, so that the access point performs scheduling transmission by using the allocated contention frequency band.

If a management area of the scheduling server and a management area of another scheduling server have an overlapping area, and the access point is located in the overlapping area, the contention frequency band allocated by the scheduling unit 240 to the access point is in a frequency band range that is allocated in advance by a decision server.

The frequency band range allocated in advance is determined by the decision server in at least one of the following manners: allocating different frequency bands to different access points; and allocating different time ranges for using a same frequency band to different access points.

Preferably, the scheduling server may further include: a receiving unit 260, configured to receive a scheduling request that is sent by the access point according to a data transmission requirement.

The scheduling request includes frequency band bandwidth information of a contention frequency band that is applied for and frequency band use time information of the contention frequency band that is applied for.

The scheduling unit 240 is further configured to allocate, within second preset duration, a contention frequency band to the access point according to the spectrum list and the scheduling request, where the second preset duration is less than the first preset duration; and if the contention frequency band that is allocated by the scheduling unit 240 to the access point according to the scheduling indication table and the spectrum list has been taken back, instruct the access point to perform scheduling transmission by using the contention frequency band that is allocated by the scheduling unit 240 to the access point according to the spectrum list and the scheduling request; or if the contention frequency band that is allocated by the scheduling unit 240 to the access point according to the scheduling indication table and the spectrum list is not taken back, instruct the access point to perform scheduling transmission by using the contention frequency band that is allocated by the scheduling unit 240 according to the scheduling indication table and the spectrum list and the contention frequency band that is allocated by the scheduling unit 240 to the access point according to the spectrum list and the scheduling request.

It should be noted that, the foregoing scheduling unit may be separately set in a form of hardware independently of a processor of the scheduling server, and may be set in a form of a microprocessor; or may be embedded in a processor of the scheduling server in a form of hardware; or may also be stored in a memory of the scheduling server in a form of software, so that the processor of the scheduling server invokes the scheduling unit to perform operations corresponding to the scheduling unit.

For example, in the second embodiment of the scheduling server (the embodiment shown in FIG. 10), the scheduling unit 240 may serve as a processor of the scheduling server, and the sending unit 250 may serve as a transmitter of the scheduling server, to correspondingly implement various operations in this embodiment.

For another example, in the first embodiment of the scheduling server (the embodiment shown in FIG. 9), the scheduling unit 220 may be a processor of the scheduling server, and functions of the receiving unit 210 and the sending unit 230 may be embedded in the processor. In addition, the updating unit and the scheduling unit 220 may be separately set independently of the processor, or may be embedded in the processor, or may also be stored in a memory in a form of software, so as to be invoked by the processor to implement functions thereof.

Certainly, the receiving unit 210 and the sending unit 230 may also respectively serve as a receiver and a transmitter of the scheduling server, and may be integrated with the scheduling unit 220 or the updating unit or may also be set independently, which is not limited in this embodiment of the present invention. The foregoing processor may be a central processing unit (CPU), a microprocessor, a single-chip microcomputer, or the like.

Figure 11:
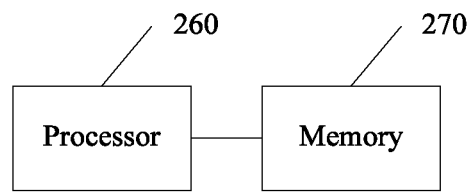
FIG. 11 is a schematic composition diagram of a third embodiment of a scheduling server.

Referring to FIG. 11, FIG. 11 is a schematic composition diagram of a third embodiment of a scheduling server. In this embodiment, the scheduling server includes: a processor 260 and a memory 270 cooperating with the processor 260.

The memory 270 is configured to store a set of program code, and the processor 260 is configured to invoke the program code stored in the memory 270, to perform the operations in either of the third and fourth embodiments of the scheduling method.

Figure 12:
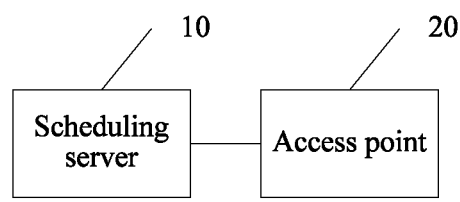
FIG. 12 is a schematic composition diagram of a first embodiment of a scheduling system.

Referring to FIG. 12, FIG. 12 is a schematic composition diagram of a first embodiment of a scheduling system. The scheduling system includes: at least one access point 10 according to the first embodiment of the access point and at least one scheduling server 20 according to the first embodiment of the scheduling server; or includes at least one access point 10 according to the second embodiment of the access point and at least one scheduling server 20 according to the second embodiment of the scheduling server.

One scheduling server 20 may be connected to multiple access points 10, and one access point 10 may be connected to multiple STAs. The access point 10 may proactively initiate a scheduling request to the scheduling server 20, to apply for frequency band scheduling, so as to achieve an effect of coexistence of contention access and scheduling access in a scheduling system.

Figure 13:
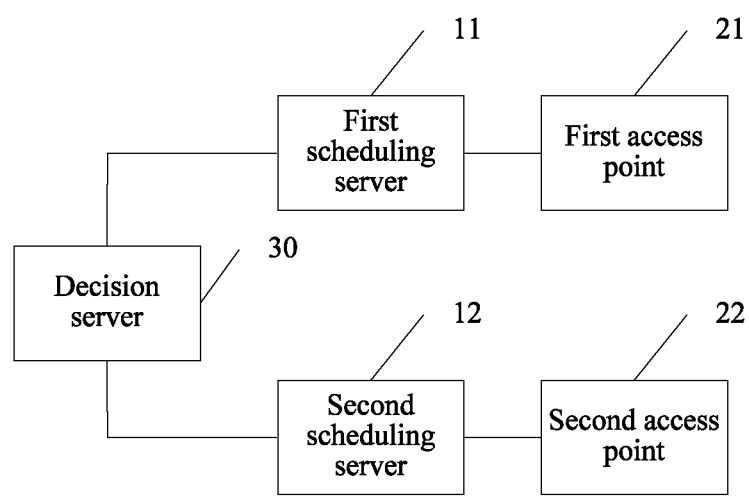
FIG. 13 is a schematic composition diagram of a second embodiment of a scheduling system.

Referring to FIG. 13, FIG. 13 is a schematic composition diagram of a second embodiment of a scheduling system according to the present invention. The scheduling system includes: a first access point 11, a second access point 12, a first scheduling server 21, a second scheduling server 22, and a decision server 30.

If the access point includes the first access point ii and the second access point 12, the scheduling server includes the first scheduling server 21 and the second scheduling server 22, the first access point 11 is connected to the first scheduling server 21, the second access point 12 is connected to the second scheduling server 22, and a management area of the first scheduling server 21 and a management area of the second scheduling server 22 have an overlapping area, the system further includes: the decision server 30, configured to: when any one or more access points located in the overlapping area initiate a scheduling request, receive the scheduling request from a corresponding scheduling server and make a decision, and send a decision result to the access point that initiates the scheduling request or forward a decision result by using the corresponding scheduling server, so that the access point that initiates the scheduling request performs scheduling transmission according to an allocated contention frequency band in the decision result, where a management area of each scheduling server is determined according to a spectrum list corresponding to each scheduling server.

The decision server 30 is integrated with any scheduling server or is set independently.

In this embodiment, a scenario of two scheduling servers is used for description; in a scenario of multiple scheduling servers, a processing manner is similar, which is not described in detail again herein. After a decision server is added, a problem of conflict, that is, overlapping frequency bands of access points connected to multiple scheduling servers, can be resolved.

It should be noted that the embodiments in this specification are all described in a progressive manner, each embodiment focuses on a difference from other embodiments, and for same or similar parts in the embodiments, refer to each other. An apparatus embodiment is basically similar to a method embodiment, and therefore is described briefly; for related parts, refer to partial descriptions in the method embodiment.

According to the description of the foregoing embodiments, the present invention has the following advantages.

In a scenario in which a frequency band is shared and contention is allowed, by initiating a scheduling request to a scheduling server, an access point may apply for a public contention frequency band for scheduling transmission; the scheduling server then allocates a suitable contention frequency band to the access point according to actual usage of a contention frequency band resource and the scheduling request of the access point, thereby implementing addition of scheduling access to a contention access system. Therefore, scheduling access and contention access can coexist, and the efficiency and compatibility of a wireless communications system are improved.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

A scheduling method, an access point, a scheduling server, and a scheduling system provided by the embodiments are described in detail above. Specific examples are used herein to illustrate the principle and implementation manner of the present invention, and the description of the foregoing embodiments is merely used to help understand the method of the present invention and the core idea thereof. Moreover, for a person of ordinary skill in the art, according to the idea of the present invention, modifications may be made to the specific implementation manner and the application scope. In conclusion, the content of the specification should not be construed as a limitation to the present invention.

What is claimed is:

1. A method, comprising:
   sending, by an access point, a scheduling request to a first scheduling server according to a data transmission requirement, wherein the scheduling request comprises frequency band bandwidth information of a contention frequency band that is applied for, and frequency band use time information of the contention frequency band that is applied for;
   receiving, by the access point, a contention frequency band that is allocated by the first scheduling server to the access point according to a first spectrum list and the scheduling request, wherein the first spectrum list comprises frequency band use information of the access point and interference information of the access point;
   performing, by the access point, scheduling transmission using the contention frequency band that is allocated by the first scheduling server to the access point; and
   in response to a management area of the first scheduling server and a management area of a second scheduling server having an overlapping area, and in response to the access point being located in the overlapping area, and after sending the scheduling request to the first scheduling server:
      receiving, by the access point, a decision result returned by a decision server, or receiving, by the access point, a decision result forwarded by the first scheduling server; and
      performing scheduling transmission according to an allocated contention frequency band in the decision result, wherein the management area of the first scheduling server is determined according to the first spectrum list corresponding to the first scheduling server, the management area of the second scheduling server is determined according to a second spectrum list corresponding to the second scheduling server, and wherein the decision result is further used to inform the second scheduling server of the allocated contention frequency band in the decision result.

2. The method according to claim 1, wherein sending the scheduling request to the first scheduling server according to the data transmission requirement comprises:
   determining, by the access point according to the data transmission requirement, whether data is transmitted in a contention frequency band manner or a scheduling frequency band manner, and in response to the data being transmitted in the scheduling frequency band manner, sending the scheduling request to the first scheduling server.

3. The method according to claim 2, wherein determining whether data is transmitted in the contention frequency band manner or the scheduling frequency band manner comprises:
   in response to a service priority of the data transmission requirement being lower than a preset priority, or in response to a data capacity of the data transmission requirement being less than a preset capacity, or in response to a data packet length of the data transmission requirement being greater than a preset packet length, or in response to a data rate of the data transmission requirement being less than a preset rate, transmitting data in the contention frequency band manner; and
   in response to the service priority of the data transmission requirement being higher than or equal to the preset priority, or in response to the data capacity of the data transmission requirement being greater than or equal to the preset capacity, or in response to the data packet length of the data transmission requirement being less than the preset packet length, or in response to the data rate of the data transmission requirement being greater than the preset rate, transmitting data in the scheduling frequency band manner.

4. The method according to claim 1, further comprising:
   in response to the access point detecting, in coverage of the access point, another access point that is not connected to the first scheduling server, reporting location information, coverage information, and information about an occupied contention frequency band that are of the detected another access point to the first scheduling server, so that the first scheduling server updates the first spectrum list and performs contention frequency band scheduling according to an updated first spectrum list.

5. The method according to claim 1, further comprising:
   broadcasting, by the access point to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

6. The method according to claim 1, further comprising:
   receiving, by the access point, scheduling termination information sent by the first scheduling server, and stopping using a contention frequency band indicated in the scheduling termination information for scheduling transmission; or
   in response to a duration in which the access point performs scheduling transmissions using the contention frequency band allocated by the first scheduling server reaches a duration defined in the frequency band use time information of the contention frequency band that is applied for, stopping, by the access point, using the contention frequency band allocated by the first scheduling server for scheduling transmission.

7. A method, comprising:
receiving, by a first scheduling server, a scheduling request that is sent by an access point according to a data transmission requirement, wherein the scheduling request comprises frequency band bandwidth information of a contention frequency band that is applied for, and frequency band use time information of the contention frequency band that is applied for;
allocating, by the first scheduling server, a contention frequency band to the access point according to a first spectrum list and the scheduling request, wherein the first spectrum list comprises frequency band use information of the access point and interference information of the access point;
sending a contention frequency band allocation result to the access point, so that the access point performs scheduling transmission by using the contention frequency band that is allocated by the first scheduling server to the access point; and
in response to a management area of the first scheduling server and a management area of a second scheduling server having an overlapping area, and in response to the access point being located in the overlapping area, and after the first scheduling server receives the scheduling request sent by the access point:
sending, by the first scheduling server, the scheduling request to a decision server;
receiving a decision result that is returned by the decision server after the decision server makes a decision; and
forwarding the decision result to the access point, so that the access point performs scheduling transmission according to an allocated contention frequency band in the decision result, wherein the management area of the first scheduling server is determined according to the first spectrum list corresponding to the first scheduling server, the management area of the second scheduling server is determined according to a second spectrum list corresponding to the second scheduling server, and wherein the decision result is further used to inform the second scheduling server of the allocated contention frequency band in the decision result.

8. The method according to claim 7, wherein the scheduling request is initiated in response to the access point determining, according to the data transmission requirement, that data needs to be transmitted in a scheduling frequency band manner; and
wherein the scheduling request being initiated in response to the access point determining that data needs to be transmitted in the scheduling frequency band manner comprises:
initiating, by the access point, the scheduling request in response to a service priority of the data transmission requirement being higher than or equal to a preset priority, or in response to a data capacity of the data transmission requirement being greater than or equal to a preset capacity, or in response to a data packet length of the data transmission requirement being less than a preset packet length, or in response to a data rate of the data transmission requirement being greater than a preset rate.

9. The method according to claim 7, wherein, after sending the contention frequency band allocation result to the access point, the method further comprises:
updating, by the first scheduling server, the first spectrum list, and recording the allocated contention frequency band and an allocated use time of the allocated contention frequency band.

10. The method according to claim 7, further comprising:
sending, by the first scheduling server, scheduling termination information to the access point, to instruct the access point to stop using a contention frequency band indicated in the scheduling termination information for scheduling transmission; or
in response to a duration in which the access point performs scheduling transmission by using the contention frequency band allocated by the first scheduling server reaching a duration defined in the frequency band use time information of the contention frequency band that is applied for, taking back, by the first scheduling server, the allocated contention frequency band and updating the first spectrum list.

11. An access point, comprising:
a transmitter, configured to send a scheduling request to a first scheduling server according to a data transmission requirement, wherein the scheduling request comprises frequency band bandwidth information of a contention frequency band that is applied for, and frequency band use time information of the contention frequency band that is applied for;
a receiver, configured to receive a contention frequency band that is allocated by the first scheduling server to the access point according to a first spectrum list and the scheduling request, wherein the first spectrum list comprises frequency band use information and interference information of the access point;
a processor, configured to:
perform scheduling transmission using the contention frequency band that is allocated by the first scheduling server to the access point; and
in response to a management area of the first scheduling server and a management area of a second scheduling server having an overlapping area, and in response to the access point being located in the overlapping area, and after the transmitter sends the scheduling request to the first scheduling server:
receive, using the receiver, a decision result returned by a decision server, or receive, using the receiver, a decision result forwarded by the first scheduling server; and
perform scheduling transmission according to an allocated contention frequency band in the decision result, wherein the management area of the first scheduling server is determined according to the first spectrum list corresponding to the first scheduling server, the management area of the second scheduling server is determined according to a second spectrum list corresponding to the second scheduling server, and wherein the decision result is further used to inform the second scheduling server of the allocated contention frequency band in the decision result.

12. The access point according to claim 11, wherein the transmitter is further configured to determine, according to the data transmission requirement, whether data is transmitted in a contention frequency band manner or a scheduling frequency band manner, and in response to data being transmitted in the scheduling frequency band manner, sending the scheduling request to the first scheduling server.

13. The access point according to claim 11, wherein the processor is further configured to:
in response to another access point that is not connected to the first scheduling server being detected in coverage of the access point, report location information, coverage information, and information about an occupied contention frequency band that are of the detected another access point to the first scheduling server, so that the first scheduling server updates the first spectrum list and performs contention frequency band scheduling according to an updated first spectrum list.

14. The access point according to claim 11, wherein the transmitter is further configured to broadcast, to a basic service set associated with the access point, a scheduling channel being used and a scheduling frequency band in which the scheduling channel is located, so that a station (STA) that is in the basic service set and that does not use the scheduling channel or that does not use the scheduling frequency band in which the scheduling channel is located applies to use the scheduling channel and the scheduling frequency band in which the scheduling channel is located.

15. A scheduling server, comprising:
a receiver, configured to receive a scheduling request that is sent by an access point according to a data transmission requirement, wherein the scheduling request comprises frequency band bandwidth information of a contention frequency band that is applied for, and frequency band use time information of the contention frequency band that is applied for;
a processor, configured to allocate a contention frequency band to the access point according to a first spectrum list and the scheduling request, wherein the first spectrum list comprises frequency band use information and interference information of the access point; and
a transmitter, configured to send a contention frequency band allocation result to the access point, so that the access point performs scheduling transmission using the contention frequency band that is allocated by the scheduling server to the access point;
wherein, in response to a management area of the scheduling server and a management area of another scheduling server having an overlapping area, and in response to the access point being located in the overlapping area, and after the receiver receives the scheduling request sent by the access point, the transmitter is further configured to send the scheduling request to a decision server;
wherein the receiver is further configured to receive a decision result that is returned by the decision server after the decision server receives the scheduling request and makes a decision; and
wherein the transmitter is further configured to forward the decision result to the access point, so that the access point performs scheduling transmission according to an allocated contention frequency band in the decision result, wherein the management area of the scheduling server is determined according to the first spectrum list corresponding to the scheduling server, the management area of the another scheduling server is determined according to a second spectrum list corresponding to the another scheduling server, and wherein the decision result is further used to inform the another scheduling server of the allocated contention frequency band in the decision result.

16. The scheduling server according to claim 15, wherein the processor is further configured to update the first spectrum list after the contention frequency band allocation result is sent to the access point, and record the allocated contention frequency band and an allocated use time of the allocated contention frequency band.

\* \* \* \* \*